US007011695B2

(12) United States Patent
Moreau et al.

(10) Patent No.: US 7,011,695 B2
(45) Date of Patent: Mar. 14, 2006

(54) BARIUM-AND CALCIUM-BASED ZEOLITIC ADSORBENT FOR GAS PURIFICATION IN PARTICULAR AIR

(75) Inventors: Serge Moreau, Vélizy Villacoublay (FR); Elise Renou, Chaville (FR); Claire Szulman, Meudon (FR)

(73) Assignee: L'Air Liquide, Societe Anonyme A Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 10/495,557

(22) PCT Filed: Oct. 16, 2002

(86) PCT No.: PCT/FR02/03539

§ 371 (c)(1),
(2), (4) Date: Sep. 7, 2004

(87) PCT Pub. No.: WO03/041858

PCT Pub. Date: May 22, 2003

(65) Prior Publication Data

US 2005/0005766 A1  Jan. 13, 2005

(51) Int. Cl.
*B01D 53/04* (2006.01)
*B01D 53/047* (2006.01)

(52) U.S. Cl. ............................... 95/96; 62/532; 62/643; 95/114; 95/117; 95/129; 95/139; 95/143; 95/144; 95/145; 95/902; 96/108; 502/79

(58) Field of Classification Search ............ 95/96–106, 95/114, 115, 117–126, 128, 129, 143–145, 95/902; 96/108, 153, 154; 502/79, 85; 62/532, 62/643
See application file for complete search history.

(56) References Cited

U.S. PATENT DOCUMENTS

| | | | | |
|---|---|---|---|---|
| 2,882,244 A | * | 4/1959 | Milton | 423/718 |
| 3,078,635 A | * | 2/1963 | Milton | 95/117 |
| 3,369,865 A | * | 2/1968 | Mattox et al. | 502/64 |
| 3,738,084 A | | 6/1973 | Simonet et al. | |
| 4,233,038 A | | 11/1980 | Tao | |
| 4,957,514 A | * | 9/1990 | Golden et al. | 95/98 |
| 5,164,076 A | * | 11/1992 | Zarchy et al. | 208/245 |
| 5,171,333 A | * | 12/1992 | Maurer | 95/100 |
| 5,264,133 A | * | 11/1993 | Forschner et al. | 210/670 |
| 5,454,857 A | * | 10/1995 | Chao | 95/96 |
| 5,531,808 A | | 7/1996 | Ojo et al. | |
| 5,587,003 A | | 12/1996 | Bülow et al. | |
| 5,616,170 A | * | 4/1997 | Ojo et al. | 95/101 |
| 5,698,013 A | * | 12/1997 | Chao | 96/108 |
| 5,922,107 A | * | 7/1999 | Labasque et al. | 95/96 |
| 5,932,509 A | * | 8/1999 | Balse et al. | 502/65 |
| 5,993,516 A | * | 11/1999 | Morris et al. | 95/96 |
| 6,053,966 A | * | 4/2000 | Moreau et al. | 95/96 |
| 6,068,678 A | * | 5/2000 | Labasque et al. | 95/96 |
| 6,261,344 B1 | * | 7/2001 | Labasque et al. | 95/96 |
| 6,270,557 B1 | * | 8/2001 | Millet et al. | 95/96 |
| 6,273,939 B1 | * | 8/2001 | Millet et al. | 95/106 |
| 6,340,382 B1 | * | 1/2002 | Baksh et al. | 95/96 |
| 6,391,092 B1 | * | 5/2002 | Shen et al. | 95/120 |
| 6,407,025 B1 | * | 6/2002 | Brandt et al. | 502/65 |
| 6,409,800 B1 | * | 6/2002 | Ojo et al. | 95/96 |
| 6,410,815 B1 | * | 6/2002 | Plee et al. | 585/828 |
| 6,425,937 B1 | | 7/2002 | Kraus et al. | |
| 6,464,756 B1 | * | 10/2002 | Plee | 95/96 |
| 2001/0009125 A1 | * | 7/2001 | Monereau et al. | 95/117 |
| 2001/0045160 A1 | * | 11/2001 | Hirano et al. | 95/96 |
| 2001/0049998 A1 | * | 12/2001 | Rode et al. | 95/117 |
| 2002/0014153 A1 | * | 2/2002 | Baksh et al. | 95/96 |

FOREIGN PATENT DOCUMENTS

| | | |
|---|---|---|
| DE | 150 887 | 9/1981 |
| EP | 0284850 A2 * | 10/1988 |
| EP | 1 064 978 A1 | 6/2000 |

OTHER PUBLICATIONS

"*Zeolite molecular sieves*", Krieger Publishing Company, 1984, p. 612, D. W. Breck.

E. Alpay, "*Adsorption parameters for strongly adsorbed hydrocarbon vapours on some commercial adsorbents*", Gas Sep. & Purif., vol. 10, No. 1, p. 25 (1996).

G. Calleja, "*Multicomponent adsorption equilibrium of ethylene, propane, propylene and CO2 on 13X zeolite*", Gas Sep. & Purif., vol. 8, No. 4, p. 247 (1994).

V. R. Choudhary, "*Sorption isotherms of methane, ethane, ethene and carbon dioxide on NaX, NaY, and Na-mordenite Zeolites*", J. Chem. Soc. Faraday Trans., 91(17), p. 2935, (1995).

A. Cointot, P. Cartaud and C. Clavaud, "*Etude de l'adsorption du protoxyde d'azote par différents tamis moléculaires*", [Study of nitrous oxide adsorption by various molecular sieves], Journal de Chimie Physique, vol. 71, No. 5, pp. 765-770 (1994).

Dr J. Reyhing's document "*Removing hydrocarbons from the process air of air-separation plants using molecular-sieve adsorbers*", Linde Reports on Science and Technology, 36/1983.

(Continued)

*Primary Examiner*—Robert H. Spitzer
(74) *Attorney, Agent, or Firm*—Linda K. Russell; Elwood L. Haynes

(57) ABSTRACT

Zeolite adsorbent, and method of production, exchanged with calcium and barium cations, for purifying or separating a gas or gas mixture, in particular air, so as to remove therefrom the impurities found therein, such as hydrocarbons and nitrogen oxides ($N_xO_y$). The adsorbent is preferably an X or LSX zeolite and the gas purification process is of the TSA type.

28 Claims, 4 Drawing Sheets

OTHER PUBLICATIONS

U. Wenning in *"Nitrous oxide in air separation plants"*, MUST, Munich'96 Meeting on Air Separation Technology, Oct. 10-11, 1996.

International Search Report for PCT/FR02/03539.
Patent Abstracts of Japan, vol. 1998, No. 09, Jul. 31, 1998, & JP 10 085589, Apr. 7, 1998.

* cited by examiner

BARIUM-AND CALCIUM-BASED ZEOLITIC ADSORBENT FOR GAS PURIFICATION IN PARTICULAR AIR

BACKGROUND

The present invention relates to a zeolite adsorbent exchanged with barium and calcium cations, to a gas purification process using such an adsorbent, in particular an air pre-treatment prior to its separation by cryogenic distillation, and to its manufacturing process.

It is known that atmospheric air contains compounds that have to be removed before the air is introduced into heat exchangers of the cold box of an air separation unit, for example carbon dioxide ($CO_2$) and/or water vapor ($H_2O$).

This is because, in the absence of such a pre-treatment of the air to remove the $CO_2$ and water vapor impurities therefrom, these impurities can condense and solidify as ice during cooling of the air to cryogenic temperature, hence resulting in problems of equipment blockage, especially in heat exchangers, distillation columns, etc.

Furthermore, it is also desirable to remove the hydrocarbon impurities likely to be present in the air so as to avoid any risk of damaging the equipment.

It is preferable also to remove the nitrogen oxides likely to be found in the air, such as $N_2O$, so as to prevent them from being concentrated and deposited in the reboilers of the cryogenic distillation plants, with the risk of blocking them.

Currently, this air pre-treatment is carried out by adsorption using, depending on the case, a TSA (Temperature Swing Adsorption) process or a PSA (Pressure Swing Adsorption) process.

TSA air purification processes have been described for example in documents U.S. Pat. No. 3,738,084 and FR-A-7 725 845.

In general, the $CO_2$ and water vapor ($H_2O$) impurities are removed over one or more beds of adsorbents, preferably several beds of adsorbents, namely in general a first adsorbent intended to preferentially stop water, for example a bed of activated alumina, of silica gel or zeolites, and a second bed of adsorbent for preferentially stopping $CO_2$, for example a zeolite. This is because effective removal of $CO_2$ and water vapor contained in the air over one and the same bed of adsorbent is not easily accomplished, as water has a markedly greater affinity for the adsorbents than $CO_2$ has, and it is therefore standard practice to use at least two beds or layers of adsorbents of different type.

In this regard, mention may, for example, be made of the documents U.S. Pat. Nos. 5,531,808, 5,587,003 and 4,233,038.

In the document "zeolite molecular sieves", Krieger Publishing Company, 1984, page 612, D. W. Breck recommends the use of an unexchanged 13X-type zeolite (sodium form) to remove small amounts of $CO_2$ and possibly of water as it has a strong affinity and selectivity for these polar molecules.

However, the 13X zeolite does not make it possible to stop, in a manner equal to or better than $CO_2$, all the harmful molecules likely to be present in a gas stream, in particular hydrocarbons and nitrogen oxides, as recalled by the following: E. Alpay, "*Adsorption parameters for strongly adsorbed hydrocarbon vapours on some commercial adsorbents*", Gas Sep. & Purif., Vol. 10, No. 1, pp. 25 (1996); G. Calleja, "*Multicomponent adsorption equilibrium of ethylene, propane, propylene and $CO_2$ on 13X zeolite*", Gas Sep. & Purif., Vol. 8, No. 4, p. 247 (1994); V. R. Choudhary, "*Sorption isotherms of methane, ethane, ethene and carbon dioxide on NaX, NaY and Na-mordenite Zeolites*", J. Chem. Soc. Faraday Trans., 91 (17), p. 2935 (1995); and A. Cointot, P. Cartaud and C. Clavaud, "*Etude de l'adsorption du protoxyde d'azote par différents tamis moléculaires*", [Study of nitrous oxide adsorption by various molecular sieves]", Journal de Chimie Physique, Vol. 71, No. 5, p. 765–770 (1974).

It therefore follows that an up-stream industrial air purification unit strictly designed for stopping carbon dioxide using a standard zeolite, typically a 13X or 5A zeolite, stops only partly, or even not at all, ethylene, propane, other hydrocarbons and nitrous oxide, as recalled in Dr J. Reyhing's document "*Removing hydrocarbons from the process air of air-separation plants using molecular-sieve adsorbers*", Linde Reports on Science and Technology, 36/1983.

As regards stopping nitrous oxide, the ineffectiveness of the 5A zeolite for stopping $N_2O$ compared with $CO_2$ was demonstrated by U. Wenning in "*Nitrous oxide in air separation plants*", MUST'96, Munich Meeting on Air Separation Technology, 10–11 Oct. 1996.

One solution was proposed in document EP-A-1 064 978, which discloses an adsorbent consisting of an X or LSX (low-silica X) zeolite exchanged to at least 30%, preferably at least 75%, with barium cations, which zeolite can be used to remove certain impurities from the air, in particular nitrous oxide, propane and ethylene, the residual cations being sodium and/or potassium cations.

The zeolites disclosed therein are obtained by an ion exchange process which is quite complex as soon as the degree of exchange with barium has to exceed 50%.

This is because a zeolite usually consists of a negatively charged aluminosilicate framework in which compensating cations occupy positions defined by the charge of the cation, by its size and polarizability, and by the charge of the zeolitic framework and its crystalline structure.

According to that document, the exchanged zeolite is obtained by ion exchange starting with an X or LSX zeolite initially containing sodium ($Na^+$), to end up with a zeolite containing at least 30% barium.

However, $Ba^{2+}$ cations are voluminous and cannot reach certain crystallographic sites occupied by the $Na^+$ cations, this having the effect of limiting the degree of exchange to about 75% at most.

To reach higher values (>75%), it is necessary to perform additional operations intended to force the cations to migrate towards the barely accessible sites. The applicable procedure consists in carrying out a first exchange with barium and then in drying the zeolite and heating it to at least 200° C. The $Ba^{2+}$ cations are then stripped of their train of solvation water molecules and, moreover, they are subjected to greater thermal agitation. Migration towards the inaccessible sites can then take place.

It should be noted that these sites are thermodynamically favored and that only steric hindrance prevents the cations from occupying them.

Moreover, it seems that it is the accessible sites, i.e. the II and II' sites, which give the barium cations their remarkable properties.

The adsorbent disclosed in EP-A-1 064 978 cannot therefore be regarded as completely satisfactory from the technical standpoint—the many hydrothermal treatments to which it has to be subjected damage its structure—and it is also very expensive compared with the adsorbents currently used because of the high amount of barium that has to be used to perform the ion exchange.

From there, the problem that then arises is to be able to have a zeolite-type adsorbent which is approximately as effective for removing hydrocarbons and, if possible, more effective for removing nitrogen oxides in a gas stream to be purified, in particular air, but which is easier to manufacture and therefore of lower cost than that known from EP-A-1 064 978.

The object of the present invention is therefore to try to solve this problem by providing an improved zeolite adsorbent that can be used to purify gases, such as air, and its manufacturing process.

SUMMARY

The solution provided by the invention is therefore a zeolite adsorbent exchanged with calcium cations and with barium cations.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
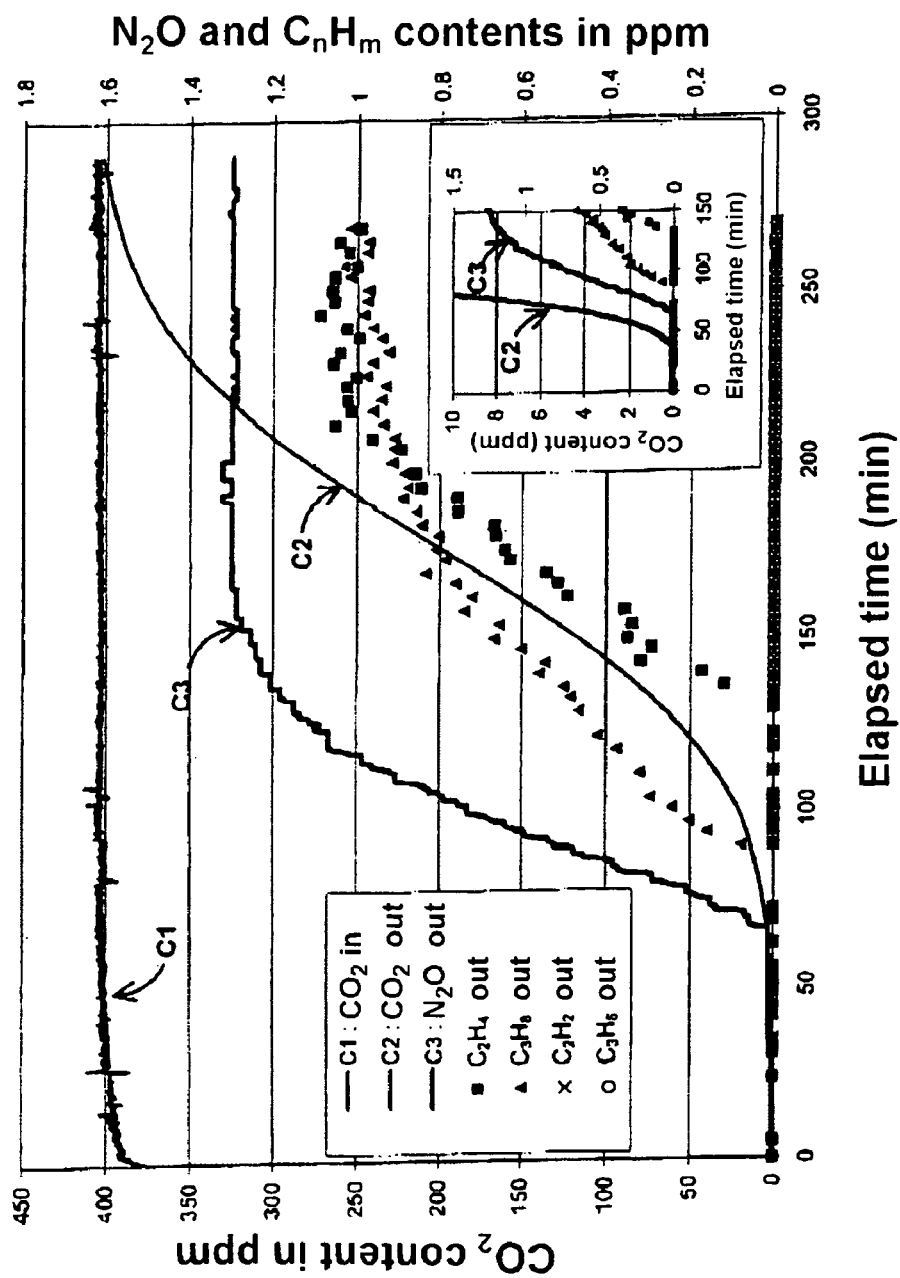
FIG. 1 is a breakthrough curve for zeolite particles of a CaBaX adsorbent.

Within the context of the invention, the expression "exchanged with cations" is understood to mean that the cations in question are those associated with $AlO_2^-$ tetrahedral units of the zeolite (zeolitic phase), which exchanged cations play a role in the mechanism of adsorbing the gaseous compounds to be removed.

Likewise, the term "exchangeable cations" is understood to mean cations that can be substituted or replaced with other cations by performing an ion exchange process.

The expression "degree of exchange of a cation X" is understood to mean the number of charges carried by the cations X present in the zeolite with respect to the total number of charges of all of the cations. The degree of exchange varies between 0 and 100%. The total positive charge carried by the cations is equal to the total negative charge carried by the $AlO_2^-$ groups. The stoichiometric amount corresponds to this total charge.

Depending on the case, the adsorbent of the invention may include one or more of the following technical features:

- it contains or is formed from X or LSX (low-silica X) zeolite;
- it is exchanged by 10 to 90% with calcium cations and by 10 to 90% with barium cations, the sum of the barium and calcium cations present representing at least 20% of the exchangeable cations;
- it is exchanged by 20 to 70% with calcium cations, preferably by 30 to 50% by calcium cations;
- it is exchanged by 20 to 70% with barium cations, preferably by 30 to 50% with barium cations;
- the sum of the barium and calcium cations present represents at least 30% of the exchangeable cations, preferably at least 40% of the exchangeable cations;
- it also contains residual sodium and/or potassium cations, preferably the sum of the residual sodium and/or potassium cations representing less than 40% of the exchangeable cations, preferably less than 30% of the exchangeable cations and even more preferably less than 20% of the exchangeable cations;
- it comprises a zeolitic phase and at least one binder representing less than 30% by weight of the total weight of the adsorbent. Preferably, the zeolitic phase represents at least 70% by weight of the total adsorption mass;
- it contains 15 to 65% calcium, 25 to 80% barium and residual sodium and/or potassium cations, the sum of the barium, calcium, sodium and potassium cations present representing at least 80% of the cations present in the adsorbent, preferably the sum of the barium, calcium, sodium and potassium cations present representing from 90% to 100% of the cations present in the adsorbent;
- the zeolite has a pore size of between 4 and 10 Å, preferably between 5 and 8 Å;
- the zeolite furthermore contains at least one cation of group IA or IIA; and
- the zeolite has an Si/Al ratio of between 1 and 1.50, preferably between 1 and 1.26.

The adsorbent of the invention can be used in a process for purifying or separating a gas or gas mixture, particularly air.

Depending on the case, the gas purification process of the invention may include one or more of the following technical features:

- at least one impurity chosen from hydrocarbons and nitrogen oxides ($N_xO_y$), preferably from ethylene, acetylene, butane and propane, is chosen;
- the $CO_2$ and/or water vapor are/is also removed over the zeolite of the invention or over a bed or several other beds, stopping these harmful gaseous compounds. For example, a bed of activated alumina may be used to adsorb water, this bed being placed upstream of the bed of Ca/Ba zeolite according to the invention when the direction of flow of the gas stream to be purified is taken into consideration;
- the process is chosen from PSA or TSA, preferably TSA, processes;
- the stream of air stripped of at least some of the impurities is subjected to at least one cryogenic distillation step so as to produce nitrogen, oxygen and/or argon;
- the gas stream is at a temperature of between $-40°$ C. and $+80°$ C., preferably between $-10°$ C. and $+50°$ C.;
- the adsorption pressure is between 2 bar and 30 bar, preferably between 4 bar and 20 bar;
- the desorption pressure is between 0.5 bar and 10 bar, preferably between 1 bar and 6 bar;
- the flow rate of the gas stream is between 1 and $10^6$ $Sm^3/h$, preferably between $10^4$ and $5 \times 10^5$ $Sm^3/h$;
- the regeneration temperature is between $60°$ C. and $400°$ C., preferably between $80°$ C. and $300°$ C.;
- the regeneration gas for the adsorbent is nitrogen or a nitrogen/oxygen mixture containing a small proportion of oxygen (a few vol %), preferably the nitrogen/oxygen mixture used to regenerate the adsorbent being a waste gas coming from a cryogenic air separation unit;
- the process of the invention is carried out in at least one adsorber, preferably in at least two adsorbers operating alternately; and
- the TSA process of the invention operates by a purification cycle, each cycle comprising the following successive steps:

1) purification of the air by adsorption of the impurities at superatmospheric pressure and at ambient temperature over the adsorbent,
2) depressurization, preferably countercurrent depressurization, of the adsorber down to atmospheric pressure or to below atmospheric pressure,
3) regeneration, preferably countercurrent regeneration, of the adsorbent at atmospheric pressure, especially by waste gases, typically impure nitrogen coming from an air separation unit and heated up to a temperature of greater than +80° C. by means of one or more heat exchangers,
4) cooling the adsorbent to ambient, super-ambient or subambient temperature, especially by continuing to introduce thereinto, preferably countercurrently, the waste gas coming from the air separation unit, but not heated and
5) repressurization, preferably countercurrent repressurization, of the adsorber with purified air coming, for example, from another adsorber, which is in the production phase.

The invention also relates to a process for manufacturing a zeolite adsorbent exchange with calcium and barium cations, in which:

(a) a zeolite containing sodium and/or potassium cations is subjected to a first ion exchange by bringing the zeolite into contact with a solution containing calcium cations;

(b) the zeolite from step (a) is subjected to a second ion exchange by bringing the zeolite into contact with a solution containing barium cations;

(c) if necessary, steps (a) and/or (b) are repeated until the desired degree of exchange for each of the barium and calcium cations has been reached; and (d) a zeolite exchanged with calcium and barium cations is recovered.

Depending on the case, the manufacturing process of the invention may include one or more of the following technical features:

after each step (a) and after each step (b), the exchange solution is drained and, optionally, the zeolite obtained is rinsed;

after step (a) and/or after step (b), a heat treatment is carried out on the zeolite by heating to more than 95° C. for a time long enough to ensure that the cations migrate towards the $AlO_2^-$ sites of the zeolite, the heating preferably being maintained for 15 minutes to 12 hours;

after each heat treatment and before any subsequent new ion exchange step, the zeolite is rehydrated, preferably with demineralized water;

the zeolite is in powder form or in agglomerated form;

the saline solutions used in one step (a) and/or in step (b) are recovered and reused during another subsequent step (a) and/or (b), in particular the barium salt solution;

the zeolite is in powder form or in agglomerated form;

the saline solutions used in step (a) and/or step (b) are recovered and reused during step (c), in particular the barium salt solution;

an amount of barium ranging from 110% to 200% of the amount introduced into the zeolite is consumed;

steps (a) and (b) are successive, in any order, or, depending on the case, carried out at the same time and in a single step using a saline solution formed from a mixture of calcium and barium salts;

steps (a) and (b) are carried out in an ion exchange column or in a stirred (batch) reactor;

steps (a) and (b) are carried out simultaneously and in a single step using a solution containing calcium and barium cations;

the starting zeolite is an X or LSX zeolite in sodium/potassium form (i.e. not exchanged) which optionally undergoes prior to step (a) a preliminary step in which it is treated with an ammonium and/or sodium solution;

after step (d), the zeolite exchanged with calcium and barium cations undergoes an activation step in a water-free medium, by purging with a dry gas or vacuum, at a temperature greater than or equal to 200° C.; and the zeolite is mixed with a binder, such as clay, silica gel or the like, in order to obtain agglomerated zeolite particles and, optionally, the binder is converted into a zeolite in order to form particles with no binder. This operation takes place before or after, preferably before, the Ca/Ba ion exchange.

The invention will now become more clearly understood thanks to the explanations and comparative examples given below as illustration and with reference to the appended figures.

The inventors of the present invention have demonstrated that, by performing a calcium exchange and then a barium exchange on an X or LSX starting zeolite, or the other way round, what is obtained at the end is an adsorbent exchanged with barium and calcium cations which, on the one hand, is easier and less expensive to manufacture than if it were solely exchanged with barium and, on the other hand, which could be used effectively to separate or purify gas mixtures, particularly air, by selective adsorption of the impurities contained in this mixture, particularly hydrocarbons and nitrogen oxides.

The process for manufacturing such a zeolite exchanged with calcium and barium consists in performing, on a zeolite, preferably an X or LSX zeolite, in sodium and/or potassium form, an ion exchange with calcium cations, to an extent sufficient to replace the sodium cations which occupy the barely accessible sites. This is because it appears that the $Ca^{2+}$ cations occupy all the sites without any difficulty, unlike the barium cations, and that the barely accessible sites are also most favorable from the thermodynamic standpoint; an amount of calcium just sufficient to occupy the barely accessible sites is therefore introduced, i.e. typically 30 to 50% of the available sites in the zeolite ($AlO_2^-$ units).

After exchange with calcium, an exchange with barium is carried out, the $Ba^{2+}$ cations occupying the accessible sites.

An alternative way of carrying out the process consists in performing the exchange in a signal go, using a mixed calcium/barium solution.

The product thus obtained has, after activation, properties similar to those of the zeolite exchanged with pure barium, with also an additional capacity for nitrogen oxides.

Moreover, the manufacture of this novel product turns out to be much easier and more favorable to the preservation of the zeolite structure, successive ion exchanges and activations always having the effect of slightly degrading the zeolite by hydrothermal attack.

In addition, the cost of the final product is appreciably lowered by two effects, namely the much simpler manufacturing process and the lower cost of calcium compared with barium.

The ion exchange is carried out on the starting zeolite, which may be an X or LSX zeolite, initially containing sodium and/or potassium which are easily exchangeable cations, the zeolite possibly being in non-agglomerated powder form or else formed into extrudates, into beads or any other form.

To carry out the ion exchanges, a solution of calcium and/or barium salts, such as a chloride solution, with a pH of less than about 6 is preferably used.

Contact between the zeolite and the saline solution takes place, for example, by immersing all of the zeolite for as short a time as possible, so as to ensure homogeneous ion exchange in the zeolite.

Alternatively, the zeolite powder is placed into a stirred suspension in water and then the solution of calcium and/or barium salts is slowly added, with stirring which is sufficient to distribute the solution throughout the entire volume in suspension.

In all cases, the contact must be carried out under conditions in which the calcium and/or barium salt is distributed throughout the entire volume of zeolite, before the exchange has had time to take place, thereby ensuring that the calcium and/or barium is distributed homogeneously throughout the mass of the zeolite.

The salt molarities are between 1M and 0.01M, the temperature is between 20° C. and 100° C. and the contact time is between 20 minutes and 3 hours.

After exchange, the zeolite is rinsed with pure water, drained and then activated between about 300° C. and 450° C. in a stream of dry gas or vacuum, under conditions which minimize contact between the steam released and the zeolite.

EXAMPLES

To demonstrate the effectiveness of a purification process according to the invention, a break-through curve (FIG. 1) was produced for zeolite particles of a CaBaX adsorbent according to the invention.

To do this, a stream of nitrogen contaminated by the impurities mentioned below was introduced into the inlet of a bed of absorbent containing the CaBaX particles and the concentration of these impurities at the outlet (downstream) of the bed was continuously measured over time.

The operating conditions for the tests were the following:
stream of nitrogen contaminated by 400 ppm by volume of $CO_2$ (curve C1), 1.3 ppmv of $N_2O$ and 1 ppmv of $C_2H_4$, $C_3H_8$, $C_2H_2$ and $C_3H_6$;
adsorption pressure: 6 bar ($6\times10^5$ Pa);
gas stream at a temperature of around 20° C.;
flow rate of the gas stream: 10 $Sm^3$/h; and
400 g of particles of a CaBaX zeolite exchanged by about 40% with Ca and by 40% with Ba and containing Na and K cations for the balance (i.e. making up to 100% of the exchangeable cations).

The results obtained are set out in FIG. 1 which shows that all the secondary impurities ($C_2H_4$, $C_3H_8$, $C_2H_2$ and $C_3H_6$) break through after the $CO_2$ (curve C2).

Moreover, it should be noted that acetylene (curve x) and propylene (curve o) do not break through after more than 250 minutes.

Furthermore, the figure shows that the $CO_2$ and $N_2O$ impurities are removed almost simultaneously for more than 60 minutes (curves C2 and C3, respectively), that is to say without any regeneration over this entire time period.

More specifically, FIG. 1 also gives (at the bottom right) an enlarged view of curves C2 and C3, showing that in fact $N_2O$ breaks through after $CO_2$.

Other similar tests were carried out using CaBaX zeolites according to the invention, but with different cation contents, in particular:

a CaBaX zeolite exchanged by 35% with calcium and by 50% with barium and containing Na and K cations for the balance (i.e. about 15%); and
a CaBaX zeolite exchanged by 45% with calcium and by 40% with barium and containing Na and K cations for the balance (i.e. about 15%).

During these tests, the operating conditions were the same as previously.

The results obtained are very similar to those given in FIG. 1, in particular, here again, it may be seen that the secondary impurities break through after the $CO_2$.

COMPARATIVE EXAMPLES WITH ADSORBENTS ACCORDING TO THE PRIOR ART

For comparison, several tests with adsorbents according to the prior art were carried out under the same conditions as those for the CaBaX zeolites of the example according to the invention.

More specifically, these comparative tests were carried out:
with an unexchanged 13X zeolite, i.e. containing only Na and K cations;
with a CaX zeolite exchanged by 60% with calcium and containing Na and K cations for the balance; and
with a BaX zeolite exchanged by 94% with barium and containing Na and K cations for the balance.

Figure 2:
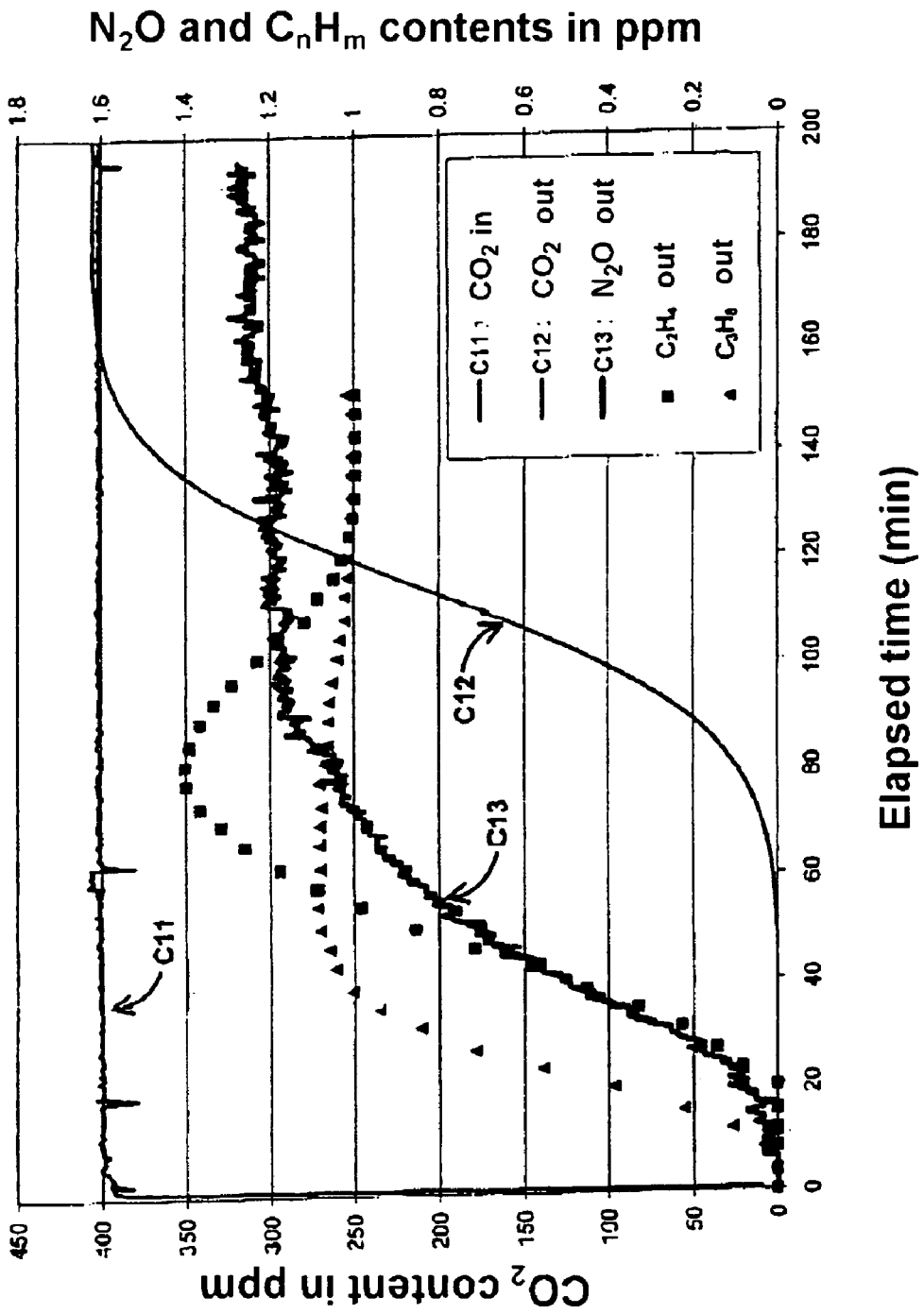
FIG. 2 is a breakthrough curve for the unexchanged 13X zeolite, ethylene, propylene, and $N_2O$.
Figure 3:
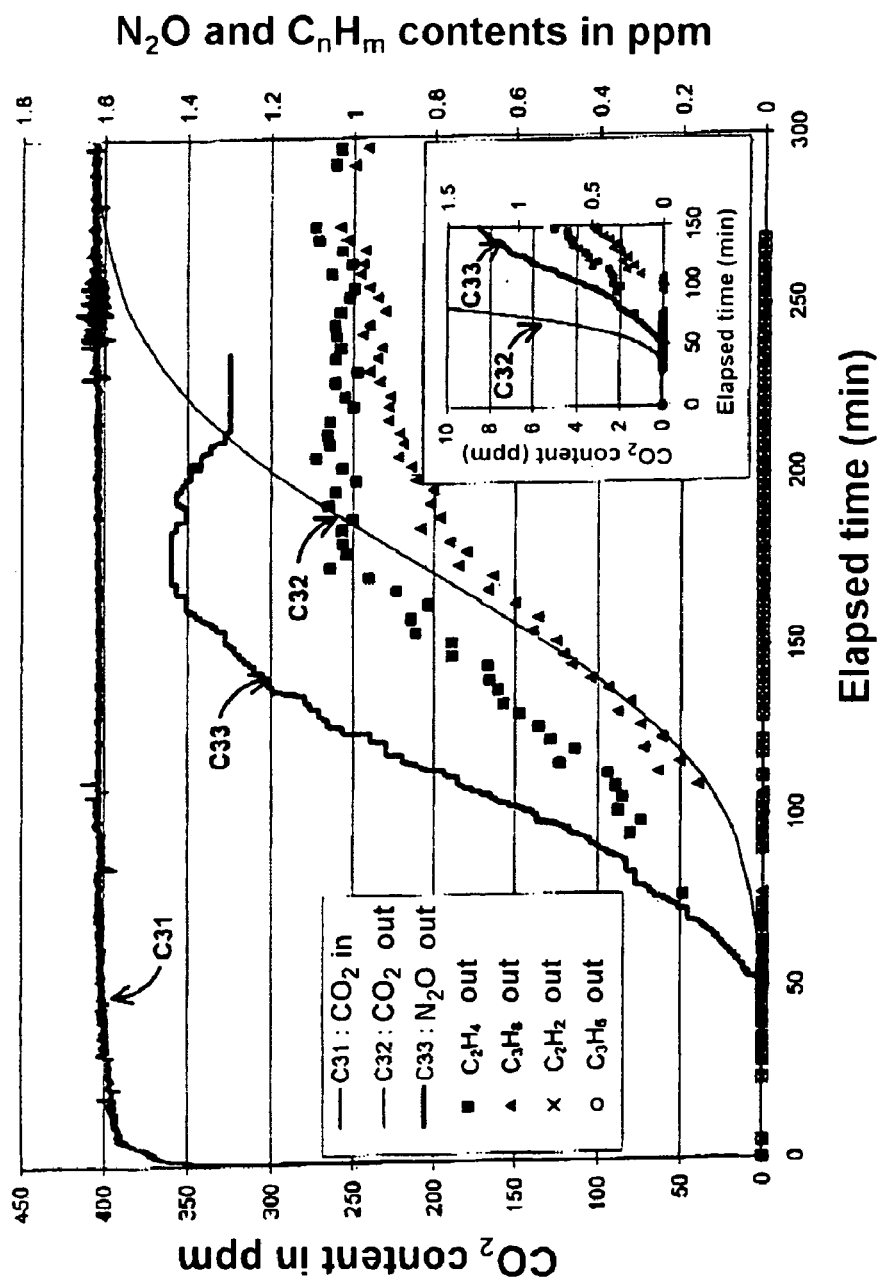
FIG. 3 illustrates the BaX zeolite exchanged by 94%.
Figure 4:
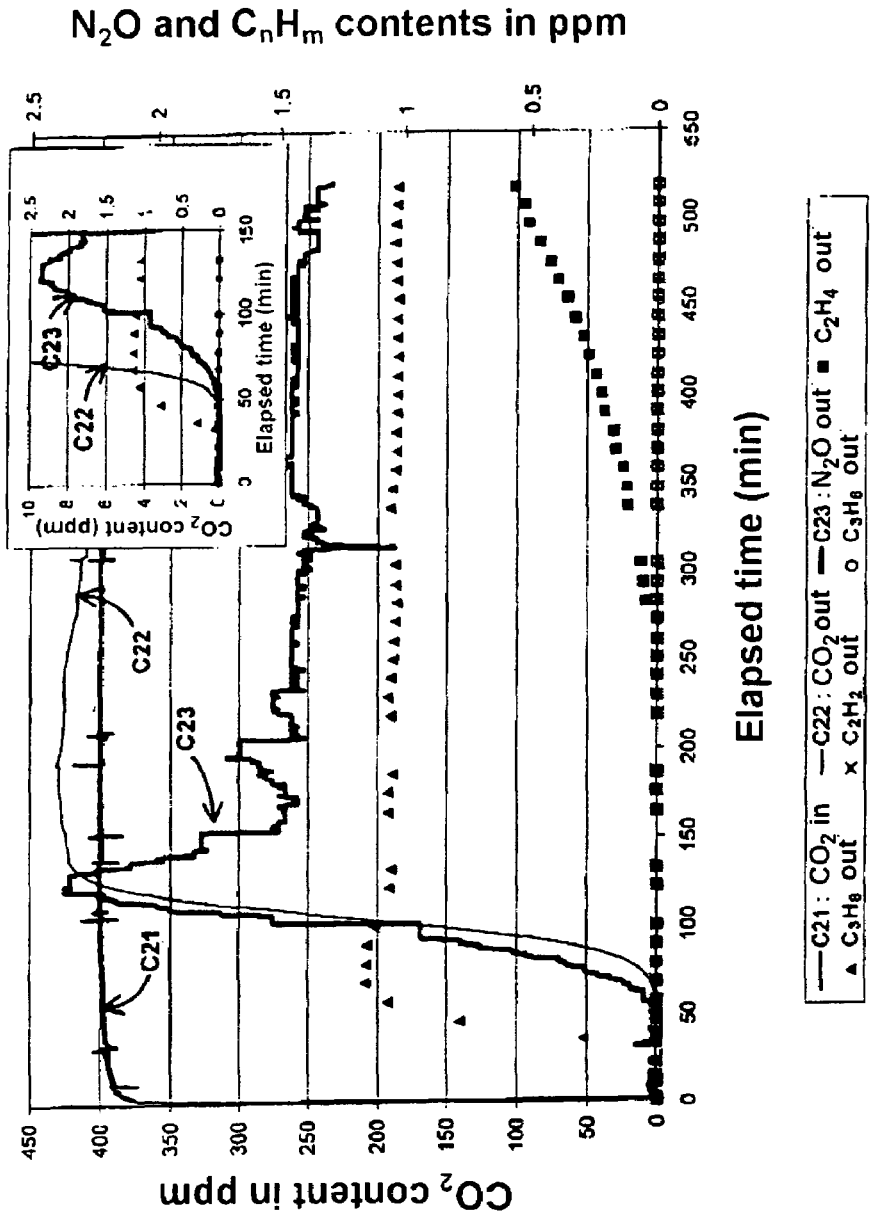
FIG. 4 illustrates the CaX zeolite exchanged by 60%.

The results obtained with these adsorbents are set out in FIGS. 2 to 4 and show that:
with the unexchanged 13X zeolite (FIG. 2), ethylene, propane and $N_2O$ break through well before $CO_2$. It should be noted that, in this case, the stream of gas tested did not contain $C_2H_2$ and $C_3H_6$ compounds;
with the CaX zeolite exchanged by 60% (FIG. 4), although ethylene is quite well stopped it seems that $N_2O$ also breaks through after $CO_2$ and that propane is not, however, removed; and
with the BaX zeolite exchanged by 94% (FIG. 3), ethylene and $N_2O$ are much less well stopped than with the CaBaX adsorbents according to the invention that were tested. It should also be noted that exchange by 94% with barium is complicated and expensive to obtain.

It is apparent from the above examples that the zeolites of the present invention exchanged with calcium and barium cations are particularly effective when used in a TSA process to purify atmospheric air of its $CO_2$ and $N_2O$, but also $C_2H_4$, $C_3H_8$, $C_2H_2$ and $C_3H_6$, impurities.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A process for purifying or separating a gas or gas mixture comprising treating said gas or gas mixture with a zeolite adsorbent comprising calcium and barium cations, wherein said adsorbent further comprises X or LSX zeolite or is produced from X or LSX zeolite.

2. The process of claim 1, wherein said gas is air.

3. The process of claim 1, wherein at least one impurity removed from said gas or gas mixture is selected from the group consisting of hydrocarbons and nitrogen oxides.

4. The process of claim 3, wherein said hydrocarbon is selected from the group consisting of ethylene, acetylene, butane, and propane.

5. The process of claim 1, wherein at least one of $CO_2$ or water vapor is also removed.

6. The process of claim 1, wherein said gas or gas mixture is treated in a process selected from the group consisting of a PSA or TSA process.

7. The process of claim 1, wherein at least part of said gas or gas mixture further comprises subjecting said gas or gas mixture to at least one cryogenic distillation step.

8. A process for purifying or separating a gas or gas mixture comprising treating said gas or gas mixture with a zeolite adsorbent comprising calcium and barium cations, wherein said adsorbent comprises exchangeable cations in the amount of from about 10 to 90% calcium cations, from about 10 to 90% with barium cations, and wherein the sum of said barium and said calcium cations represents at least about 20% of the total exchangeable cations available in said adsorbent.

9. The process according to claim 8, wherein said gas or gas mixture is air and wherein said adsorbent comprises X or LSX zeolite or is produced from X or LSX zeolite.

10. The process of claim 8, wherein at least one impurity removed from said gas mixture is selected from the group consisting of hydrocarbons and nitrogen oxides.

11. The process of claim 10, wherein said hydrocarbon is selected from the group consisting of ethylene, acetylene, butane, and propane.

12. The process of claim 8, wherein at least one of $CO_2$ or water vapor is also removed.

13. The process of claim 8, wherein said gas or gas mixture is treated in a process selected from the group consisting of a PSA or TSA process.

14. The process of claim 8, wherein at least part of said gas or gas mixture further comprises subjecting said gas or gas mixture to at least one cryogenic distillation step.

15. A zeolite adsorbent comprising calcium and barium cations, wherein said adsorbent further comprises X or LSX zeolite or is produced from X or LSX zeolite.

16. The adsorbent of claim 15, wherein said adsorbent comprises exchangeable cations in the amount of from about 10 to 90% calcium cations, from about 10 to 90% with barium cations, and wherein the sum of said barium and said calcium cations represent at least about 20% of the total exchangeable cations available in said adsorbent.

17. The adsorbent of claim 16, wherein said adsorbent is exchanged with about 20 to 70% with said calcium cations.

18. The adsorbent of claim 16, wherein said adsorbent is exchanged with about 20 to 70% with said barium cations.

19. The adsorbent of claim 16, wherein the sum of said barium and said calcium cations present on said adsorbent represents at least about 30% of the exchangeable cations.

20. The adsorbent of claim 16, further comprising residual sodium and/or potassium cations, wherein the sum of the residual sodium and/or potassium cations represents less than about 40% of the exchangeable cations.

21. The adsorbent of claim 20, further comprising about 15 to 65% said calcium, about 25 to 80% said barium, and said residual sodium and/or potassium cations, wherein the sum of said barium, calcium, sodium, and potassium cations present represents at least about 80% of the cations present in said adsorbent.

22. The adsorbent of claim 21, wherein the sum of said barium, calcium, sodium, and potassium cations present represents from about 90% to 100% of the cations present in the adsorbent.

23. The adsorbent of claim 15, further comprising at least one binder, wherein said binder represents less than about 30% by weight of the total weight of said adsorbent.

24. A zeolite adsorbent comprising calcium and barium cations, wherein said adsorbent comprises exchangeable cations in the amount of from about 10 to 90% calcium cations, from about 10 to 90% with barium cations, and wherein the sum of said barium and said calcium cations represents at least about 20% of the total exchangeable cations available in said adsorbent.

25. The process for manufacturing a zeolite adsorbent comprising calcium and barium cations, comprising:
   (a) subjecting a zeolite containing sodium and/or potassium cations to a first ion exchange by bringing said zeolite into contact with a solution containing calcium cations;
   (b) subjecting said zeolite from step (a) to a second ion exchange by bringing said zeolite into contact with a solution containing barium cations;
   (c) repeating as necessary steps (a) and/or (b) until the desired degree of exchange for each of said barium and calcium cations has been reached; and
   (d) recovering a zeolite exchanged with calcium and barium cations, wherein said zeolite comprises X or LSX zeolite.

26. The process of claim 25, further comprising steps (a) and (b) being carried out simultaneously and in a single step using a solution containing calcium and barium cations.

27. The process of claim 25, further comprising heating the zeolite prior to step (a) to more than 95° C. for a time long enough to ensure that the cations migrate towards the $AlO_2^-$ sites of the zeolite.

28. The process of claim 27, further comprising rinsing said zeolite after each heat treatment step and before any subsequent new ion exchange step.

* * * * *